United States Patent [19]

Bull et al.

[11] Patent Number: 5,171,769
[45] Date of Patent: Dec. 15, 1992

[54] FILLED THIXOTROPIC RESIN COMPOSITIONS COMPRISING EPOXY RESIN, CURING AGENT, SUGAR-ALDEHYDE AND FILLER

[75] Inventors: Christopher H. Bull, Trumpington; Richard J. Martin, Cambridge, both of England

[73] Assignee: Ciba-Geigy Corporation, Ardsley, N.Y.

[21] Appl. No.: 684,550

[22] Filed: Apr. 11, 1991

Related U.S. Application Data

[63] Continuation-in-part of Ser. No. 487,562, Mar. 2, 1990, abandoned.

[30] Foreign Application Priority Data

Mar. 3, 1989 [GB] United Kingdom ............... 8904862

[51] Int. Cl.$^5$ ............... C08L 63/00; C08G 59/42; C07D 317/20
[52] U.S. Cl. .............................. 523/447; 528/107
[58] Field of Search .................... 523/447; 528/107

[56] References Cited

U.S. PATENT DOCUMENTS

| | | | |
|---|---|---|---|
| 3,892,585 | 7/1975 | Sagane | 523/455 |
| 3,925,278 | 12/1975 | Murai et al. | 523/447 |
| 4,286,890 | 9/1981 | Dickmann et al. | 401/16 |

FOREIGN PATENT DOCUMENTS 0249701  9/1988  European Pat. Off.
1430866  4/1976  United Kingdom

OTHER PUBLICATIONS

Chem. Abst. 99, 112942j (1983).
Chem. Abst. 83, 133507f (1975).
Patent Absts. of Japan 13, 151 (C-584) (3499).
Patent Absts. of Japan 10, 362 (C-389) (2419).
Patent Absts. of Japan 11, 53 (C-404) (2500).
Patent Absts. of Japan 12, 338 (C-527) (3185).

*Primary Examiner*—John C. Bleutge
*Assistant Examiner*—Frederick Krass
*Attorney, Agent, or Firm*—Luther A. R. Hall

[57] ABSTRACT

A filled thixotropic resin composition (A) comprises a curable epoxide resin, a filler and, as thickening agent, a condensation product of a sugar alcohol with an aromatic aldehyde, the composition being thickened and made thixotropic such that the filler remains substantially uniformly dispersed therein on storage and such that upon addition of (B) a curing amount of a curing agent comprising a polyamine having at least one primary amine group attached directly to an aliphatic or cycloaliphatic carbon atom or a polycarboxylic acid anhydride, the curing agent substantially counteracts the thixotropic effect of the thickening agent to give a pourable curable composition which is no longer thixotropic and has a viscosity up to about 200 Pa s.

17 Claims, No Drawings

FILLED THIXOTROPIC RESIN COMPOSITIONS COMPRISING EPOXY RESIN, CURING AGENT, SUGAR-ALDEHYDE AND FILLER

This is a continuation-in-part of application Ser. No. 487,562 filed Mar. 2, 1990, now abandoned.

This invention relates to epoxide resin compositions, particularly to filled epoxide resin compositions suitable for use in the production of mouldings and in the encapsulation or potting of electrical or electronic components.

In many applications where epoxide resins are used, substantial amounts of fillers are incorporated into the epoxide resin compositions in order to give them the desired mechanical properties on curing. In two-part systems comprising a liquid epoxide resin component and a hardener component, fillers are conventionally dispersed in the liquid epoxide resin component. However, fillers denser than the resin tend to settle on storage, while low density fillers tend to rise. In either case, the result is non-uniform distribution of the filler in the epoxide resin. In order to minimise this effect, a thixotropy-inducing material (thickening agent) is conventionally added to the epoxide resin component to convert it into a thixotropic state, i.e. a thickened, structured state, sometimes referred to as "false body", in which the fillers remain uniformly distributed in the epoxide resin. However, when the conventional thixotropic epoxide resin component is mixed with the hardener component, for example a polyamine, to form a curable composition, the resulting mixture generally remains thixotropic or has high structural viscosity, rendering it non-pourable and therefore giving rise to difficulties in many applications, particularly moulding, encapsulating and potting applications. In the potting of electrical components having a complex surface configuration with such compositions, poor penetration of the composition into the structure of the component can result.

When using epoxide resin compositions to produce mouldings or to encapsulate or pot electrical components, it is important that the compositions should be free from entrained air (or other gases) to avoid defects in the cured resin structure. The compositions are therefore conventionally de-gassed before introduction into a mould or into an electrical component to be potted, for example by connecting the vessel in which they are mixed to a vacuum line. With conventional compositions, formed by mixing a conventional thixotropic epoxide resin component as described above and a hardener component, such de-gassing is difficult. Application of a vacuum to such compositions for a relatively long time is necessary to ensure the removal of entrained gases. Furthermore, if the resin-hardener mixture is subsequently poured into a mould at atmospheric pressure, air may be entrained in the form of bubbles. With conventional compositions, such bubbles escape to the surface at best only slowly and at worst not at all.

If a composition obtained by mixing a conventional thixotropic epoxide resin component with a hardener component is heated in an attempt to overcome the problems caused by its thixotropy or high viscosity, the storage life of the composition is drastically reduced. This increases the risk that the composition will set, i.e. irreversibly solidify, before use on a production line, for example in a reservoir from which it is supplied intermittently to moulds. Thus, heating of such conventional compositions imposes a severe constraint on their subsequent use.

It has now been found that a condensation product of a sugar alcohol and an aromatic aldehyde can be added as thickening agent to a liquid epoxide resin composition containing a filler dispersed therein to form a filled thixotropic resin composition, i.e. a thickened filled resin composition which has sufficient structure or false body that the filler remains substantially uniformly dispersed during storage, which thixotropic composition, in contrast to conventionally thickened epoxide resin components, loses its false body and is no longer thixotropic so as to become readily pourable when mixed with a polyamine curing agent having at least one primary amine group attached to an aliphatic or cycloaliphatic carbon atom, or a polycarboxylic acid anhydride curing agent, without the need to heat the composition. This is highly surprising in view of British Patent Specification No. 1 430 866, which describes the mixing of ingredients including an epoxide resin, diethylenetriamine as curing agent and a condensation product of sorbitol and benzaldehyde to form a composition which is thixotropic. In many cases, the viscosity of a curable composition of the present invention is as low as, or almost as low as, the viscosity of a corresponding composition containing no thickening agent. The compositions of the present invention can also be readily de-gassed before use, e.g. in moulding and encapsulating. In the encapsulation or potting of electrical components having a complex surface configuration, for example transformers, the curable epoxide resin compositions of the invention show good penetration into the structure of the components.

Accordingly, the present invention provides (A) a filled thixotropic resin composition comprising a curable epoxide resin, a filler and, as thickening agent, a condensation product of a sugar alcohol with an aromatic aldehyde, the composition being thickened and made thixotropic such that the filler remains substantially uniformly dispersed therein on storage and such that upon addition of (B) a curing amount of a curing agent comprising a polyamine having at least one primary amine group attached directly to an aliphatic or cycloaliphatic carbon atom or a polycarboxylic acid anhydride, the curing agent substantially counteracts the thixotropic effect of the thickening agent to give a pourable curable composition which is no longer thixotropic.

The present invention also provides a pourable non-thixotropic curable composition obtained by mixing
(A) a filled thixotropic resin composition as hereinbefore defined with
(B) a curing amount of a curing agent comprising a polyamine having at least one primary amine group attached directly to an aliphatic or cycloaliphatic carbon atom or a polycarboxylic acid anhydride.

The present invention also provides a method of producing a pourable non-thixotropic curable composition which comprises mixing
(A) a filled thixotropic resin composition as hereinbefore defined with
(B) a curing amount of a curing agent comprising a polyamine having at least one primary amine group attached directly to an aliphatic or cycloaliphatic carbon atom, or a polycarboxylic acid anhydride,
whereby the thixotropic effect of the thickening agent is substantially counteracted so as to give a pourable curable composition which is no longer thixotropic.

The curable epoxide resin, i.e. the resin having on average more than one epoxide group per molecule, used in the thixotropic composition (A) may be a liquid epoxide resin or a solid epoxide resin. When a solid epoxide resin is used, it is mixed together with sufficient liquid epoxide resin and/or diluent to render the mixture liquid.

Suitable epoxide resins include those having, on average, more than one glycidyl group per molecule directly attached to an atom or atoms of oxygen, nitrogen or sulphur.

As examples of such resins may be mentioned polyglycidyl esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic carboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, hexahydrophthalic acid and 4-methylhexahydrophthalic acid; and from aromatic polycarboxylic acids such as phthalic acid, isophthalic acid, and terephthalic acid.

Further examples are polyglycidyl ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)glycols, propane-1,2-diol and poly(oxypropylene)glycols, propane-1,3-diol,butane-1,4-diol, poly(oxytetramethylene)glycols, pentane-1,5-diol, hexan-1,6-diol, hexan-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline. They may also be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, bis(4-aminophenyl)methane, m-xylylenediamine, and bis(4-methylaminophenyl)methane; triglycidyl isocyanurate; and N,N'-diglycidyl derivatives of cyclic alkylene ureas, such as ethyleneurea and 1,3-propyleneurea, and of a hydantoin such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Epoxide resins having the glycidyl groups attached to different kinds of hetero atoms may be employed, e.g. the N,N,O-triglycidyl derivative of 4-aminophenol, the glycidyl ether-glycidyl ester of salicyclic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

If desired, a mixture of two or more of the abovementioned polyglycidyl compounds may be used.

Preferred epoxide resins are polyglycidyl ethers, including both liquid and solid polyglycidyl ethers, of polyhydric phenols, especially of bisphenol A or bisphenol F; polyglycidyl ethers of polyhydric alcohols, especially of 1,4-butanediol; poly(N-glycidyl)derivatives of aromatic amines, especially of aniline and bis(4-aminophenyl)methane; and mixtures of two or more of such resins.

Diluents are necessary when a solid epoxide resin is used without a liquid epoxide resin. They may also be used together with a liquid epoxide resin to reduce its viscosity to a desired level. Such diluents may be monoepoxide diluents or they may be non-epoxide diluents, including the monoepoxide and non-epoxide diluents conventionally used in curable epoxide resin compositions. Thus suitable diluents include monoepoxides such as monoglycidyl ethers of alcohols or phenols, for example alkyl glycidyl ethers such as n-butyl glycidyl ether, 2-ethylhexyl glycidyl ether, n-octyl glycidyl ether, decyl glycidyl ethers, dodecyl glycidyl ethers or tetradecyl glycidyl ethers and aryl glycidyl ethers such as phenyl glycidyl ether or cresyl glycidyl ethers, glycidyl esters of mixed tertiary aliphatic monocarboxylic acids and mixtures of two or more of these monoepoxide diluents; non-epoxide diluents such as diesters of phthalic acid, for example dibutyl phthalate, diallyl phthalate and dioctyl phthalate, triesters of phosphoric acid, for example triphenyl phosphate, tricresyl phosphate, triesters of phosphorus acid, for example triphenyl phosphite, high-boiling aromatic hydrocarbons such as styrene or ACTREL ® 400 (available from Exxon), glycols such as ethylene glycol or propylene glycol, benzyl alcohol or cumylphenyl acetate. Preferred diluents are monoglycidyl ethers of alcohols and diesters of phthalic acid.

In particularly preferred embodiments, the epoxide resin is a liquid diglycidyl ether of bisphenol A, without a diluent or with a dibutyl phthalate as diluent; a mixture of a minor amount of a solid diglycidyl ether of bisphenol A with a major amount of a liquid diglycidyl ether of bisphenol A, used together with 2-ethylhexyl glycidyl ether, or a mixture of n-octyl glycidyl ether and n-decyl glycidyl ether; a mixture of a major amount of a solid diglycidyl ether of bisphenol A with a minor amount of 1,4-butanediol diglycidyl ether (preferred weight ratio 2:1); or N,N-diglycidylaniline.

The viscosity of the epoxide resin, or the mixture of epoxide resin and diluent, may be varied according to requirements depending on the purpose for which the curable composition is to be used. Generally this viscosity is between 0.2 and 5 Pa s.

The filler used in the thixotropic composition (A) may be a filler conventionally used in epoxide resin compositions to impart the desired physical properties to the cured resin product. Thus suitable fillers include calcium carbonate, calcium sulphate, barium sulphate, magnesium carbonate, metal powders such as aluminium and iron powders, aluminium silicate, magnesium silicate, hydrated alumina, tabular alumina, silica flour, sand, zirconium silicate, lithium aluminium silicate, magnesium aluminium silicate, iron oxide, mica, dolomite, wollastonite, talc, wood flour, fibrous fillers, e.g. glass, carbon or cellulosic fibres, glass beads, hollow glass or silicaceous microspheres and organic polymer fillers such as powdered polypropylene and poly(vinylidene chloride) microspheres. Mixtures of two or more of these fillers can be used.

As will be understood by those skilled in formulating epoxide resin compositions, the amount of filler incorporated in the thixotropic composition (A) may vary according to the purpose for which the curable composition is to be used and according to the properties required in the cured product. This amount may be an amount conventionally used in epoxide resin compositions for the same end use and may vary according to the density of the filler. In general the weight ratio of filler to epoxide resin or, where a diluent is present, filler to epoxide resin plus diluent, may be from 0.05:1 to 5:1. For most applications, this weight ratio is preferably from 0.1:1 to 3:1, especially from 0.75:1 to 3:1 for fillers denser than the resin, or mixture of resin and diluent, and from 0.1:1 to 0.5:1 for fillers less dense than the resin, or mixture of resin and diluent.

Sugar alcohols from which sugar alcohol-aromatic aldehyde condensation products useful as thickening agents may be derived include pentahydric and hexahydric alcohols such as xylitol, arabitol, mannitol and sorbitol. Preferably the thickening agent used in the composition (A) is a condensation product of xylitol, mannitol or sorbitol with an aromatic aldehyde. Products derived from sorbitol are especially preferred.

Aromatic aldehydes from which sugar alcohol - aromatic aldehyde condensation products useful as thickening agents may be derived include benzaldehydes, for example benzaldehyde itself and ring-substituted benzaldehyde such as alkyl-, e.g. methyl- or isopropyl-, substituted benzaldehydes, alkoxy-, e.g. methoxy-, substituted benzaldehydes, halo-, e.g. chloro- or bromo-, substituted benzaldehydes and nitro-substituted benzaldehydes. Preferably, the thickening agent used in the composition (A) is derived from benzaldehyde or an alkyl-, alkoxy- or halo-substituted benzaldehyde. Condensation products derived from benzaldehyde, 4-methylbenzaldehyde, 4-methoxybenzaldehyde or 4-chlorobenzaldehyde are especially preferred.

The condensation product may be produced by reacting the sugar alcohol with the aromatic aldehyde using conventional methods for such condensation reactions. Thus the sugar alcohol and the aldehyde may be heated together in an inert solvent at temperatures up to 80° C. under azeotropic conditions. Since 1 mol of the aromatic aldehyde reacts with two hydroxyl groups of the sugar alcohol in the condensation reaction, 1 mol of the sugar alcohol may be reacted with an amount of aldehyde between 1 mol and x mols where x denotes the number of condensable pairs of hydroxyl groups in the sugar alcohol. Thus 1 mol of a pentahydric alcohol such as xylitol may be reacted with from 1 to 2 mols of the aldehyde, to give mono- or di-benzylidene products, or mixtures thereof, while 1 mol of a hexahydric alcohol such as sorbitol may be reacted with from 1 to 3 mols of the aldehyde to give mono-, di- or tri-benzylidene products or mixtures thereof.

Specific condensation products especially preferred for use in the thixotropic composition (A) include dibenzylidenesorbitol, di(4-methylbenzylidene)sorbitol, di(4-methoxybenzylidene)sorbitol, di(4-chlorobenzylidene)sorbitol, dibenzylidene mannitol and dibenzylidenexylitol.

The thickening agent may be present in any amount which ensures that the filler remains substantially uniformly dispersed in the thixotropic composition on storage and that a pourable non-thixotropic composition results on mixing the thixotropic composition with a curing amount of the curing agent (B). Such an amount may be readily determined by routine experimentation given the information provided in this specification. The amount of thickening agent is generally from 0.1 to 5%, preferably from 0.5 to 3%, and especially from 0.75 to 2%, by weight of the epoxide resin or, where diluent is present, by weight of the epoxide resin plus diluent.

The thickening agent may be incorporated in the composition (A) by various methods. In one method, the thickening agent is dissolved in the epoxide resin, or in a mixture of the epoxide resin and the diluent, at elevated temperature, usually 80°-120° C., and the resulting mixture is cooled to below 80° C., usually to 20°-70° C., the filler being stirred in at the elevated temperature or after cooling. In a preferred embodiment, the mixture is cooled to about 40°-70° C. and the filler is then stirred into the mixture.

The thickening agent may be incorporated as a solution in an organic solvent which is miscible with the epoxide resin or mixture thereof with a diluent. Thus, in a second method, the thickening agent is dissolved in a solvent, such as dimethyl sulphoxide, dimethylformamide or, preferably, N-methylpyrrolidone, and the solution, usually at ambient temperature, is added to a stirred dispersion of the filler in the resin or in the mixture of the resin and the diluent. In this second method, usually at least 3 parts by weight of solvent per part by weight of thickening agent are required; since only a small amount of thickening agent is used, the amount of solvent required is not great and is tolerable for most applications. However, where it is desired to reduce the amount of solvent to a minimum but to avoid heating the epoxide resin, or its mixture with a diluent, to temperatures of 80° to 120° C. a third method may be used. In this method, 1 part by weight of the thickening agent is dissolved in 1.5 to 2 parts by weight of the solvent at above 60° C. and the hot solution is added to a rapidly stirred dispersion of the filler in the resin, or mixture thereof with a diluent, preheated to about 60° to 70° C.

The thixotropic composition (A) may also contain minor amounts of other additives conventionally used in epoxide resin compositions, such as pigments, dyes, fire retardants, antifoaming agents, wetting agents and polymeric toughening agents. Generally the total weight of these further additives can amount to up to 10% by weight of the thixotropic composition.

The polyamine or anhydride curing agent (B) is usually a liquid, although it is envisaged that a solid which dissolves in the epoxide resin, or mixture thereof with diluent, could also be used.

As examples of polyamines, i.e. materials having, on average, more than one amine group per molecule, which have at least one primary amine group attached to an aliphatic carbon atom, there may be mentioned those known as curing agents for epoxide resins, including:

alkylenediamines such as ethylenediamine, propane-1,2-diamine, propane-1,3-diamine, butane-1,4-diamine, hexamethylenediamine and trimethylhexamethylenediamines;

mono-N-hydroxyalkyl derivatives of alkylenediamines such as N-(2-hydroxyethyl)ethylenediamine and N-(2-hydroxypropyl)ethylenediamine;

polyalkylenepolyamines, for example polyethylenepolyamines and polypropylenepolyamines such as diethylenetriamine, triethylenetramine, tetraethylenepentamine, dipropylenetriamine and tripropylenetetramine;

N-hydroxyalkyl derivatives of polyalkylenepolyamines such as N-(hydroxyethyl)diethylenetriamine, N-(hydroxypropyl)dipropylenetriamine, a mono-N-2-hydroxyethyl derivative of triethylenetetramine, and a mono-N-2-hydroxypropyl derivative of triethylenetetramine;

polyoxyalkylenepolyamines, for example polyoxyethylenediamines, polyoxyethylenetriamines, and polyoxypropylenediamines and polyoxypropylenetriamines such as those described in U.S. Pat. No. 3,654,370 including polyoxypropylenediamines of formula $H_2N-CH(CH_3)-CH_2[OCH_2-CH(CH_3)]_xNH_2$ where x is from 2 to 40 and polyoxypropylenetriamines derived from 1,1,1-trimethylolpropane, e.g. those of formula

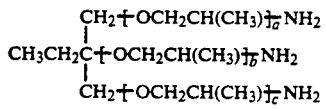

where a, b, and c are each from 1 to 15, many of which polyoxypropylene-diamines and triamines are available from Texaco Ltd., 195 Knightsbridge, London SW7 1RU, England under the registered trade mark JEFFAMINE ®:

N,N-dialkylalkylenediamines such as N,N-diethylethylenediamine, N,N-dimethylpropane-1,3-diamine and N,N-diethylpropane-1,3-diamine;

Cycloaliphatic amines having an amino or aminoalkyl substituent attached to the ring, such as 3-aminomethyl-3,5,5-trimethylcyclohexylamine (isophoronediamine) or 4,4'-diamino-3,3'-dimethyldicyclohexylmethane, N-aminoalkylpiperazines such as N-(2-aminoethyl)-piperazine and N-(3-aminopropyl)piperazine; and polyaminoamides, for example reaction products of aliphatic polyamines such as the polyalkylenepolyamines hereinbefore mentioned with polymerised unsaturated fatty acids, for example polymerised vegetable oil acids such as dimerised or trimerised linoleic and ricinoleic acids.

Mixtures of two or more polyamines as hereinbefore described may be used. Minor amounts of other polyamine curing agents, for example polyamines having primary amine groups attached only to aromatic or cycloaliphatic carbon atoms may be used together with the polyamine having a primary amine group attached to an aliphatic carbon atom.

Preferred polyamines are 2,2,4-trimethylhexamethylenediamine, 2,3,3-trimethylhexamethylenediamine, triethylenetetramine, a mono-N-hydroxypropyl derivative of triethylenetetramine, polyoxypropylene triamines derived from 1,1,1-trimethylolpropane, N,N-diethylpropane-1,3-diamine, isophoronediamine, N-(2-aminoethyl)piperazine, a polyaminoamide reaction product of a polymerised vegetable oil acid and a polyalkylenepolyamine, and mixtures of two or more of these preferred amines.

Polycarboxylic acid anhydrides suitable for use as the curing agent (B) may be those known as curing agents for epoxide resins, including nonenylsuccinic anhydride, dodecenylsuccinic anhydride, methyltetrahydrophthalic anhydride, methylbicyclo[2.2.1]heptane-2,3-dicarboxylic acid anhydride, blends of hexahydrophthalic anhydride with tetrahydrophthalic anhydride, of methylbicyclo[2.2.1]heptane-2,3-dicarboxylic anhydride with phthalic or tetrahydrophthalic anhydride, of hexahydrophthalic anhydride with phthalic or dodecenylsuccinic anhydride and of tetrahydrophthalic anhydride with methyltetrahydrophthalic or dodecenylsuccinic anhydride, and mixtures of two or more of the above-mentioned anhydrides and/or blends. Carboxyl-containing adducts of anhydrides, such as those hereinbefore described, with alcohols, particularly glycols, may be used as co-curing agents together with anhydrides.

Preferred anhydride curing agents include dodecenylsuccinic anhydride and methyltetrahydrophthalic anhydride.

An appropriate accelerator may be used together with the curing agent. The accelerator may be one conventionally used with the chosen curing agent. For example, when a polyamine is used as curing agent, the accelerator may be a carboxylic or sulphonic acid, a phenyl or a Mannich base. When an anhydride is used as curing agent, the accelerator may be a tertiary amine or a tertiary amine salt.

A curing amount of the curing agent (B) is employed. The optimum proportion can readily be determined by methods familiar to those skilled in the art. When the curing agent is a polyamine, it is normally used in an amount to provide from about 0.75 to 1.25 amino-hydrogen equivalents per 1,2-epoxide equivalent of the thixotropic composition (A). When a polycarboxylic acid anhydride is used as curing agent, it is normally used in amount to provide from about 0.4 to 1.1 anhydride equivalents per 1,2-epoxide equivalent of the thixotropic composition (A).

Diluents and other additives, such as those hereinbefore described which do not react with amine or anhydride groups, may be added to the curing agent where desired.

The pourable curable composition of the invention may be formed simply by stirring together the thixotropic composition (A) and the curing agent (B) at ambient temperature. Further processing of the pourable composition depends on the particular application, but in all applications the composition can be allowed to set (solidify) at ambient temperature or heated moderately in accordance with conventional practice to accelerate setting. Subsequently the set composition may be heated at higher temperatures to effect post-cure, in accordance with conventional procedures.

In order to form a pourable non-thixotropic composition, the thixotropic composition (A) and the curing agent (B) on mixing should generally give a composition having a viscosity of up to about 200 Pa s, preferably less than 100 Pa s, especially less than 50 Pa s, measured on a Brookfield viscometer using a No. 7 spindle at 5 r.p.m. It will be understood by those skilled in the art, however, that the composition (A) can have a measurable viscosity below 200 Pa s, even below 100 Pa s, and yet be thixotropic when it contains an epoxide resin, or a mixture thereof with a diluent, which has a very low viscosity.

The invention also provides a two-part pack comprising a first part containing (A) a thixotropic composition as hereinbefore described and a second part containing (B) a curing agent as hereinbefore described, the two parts on mixing giving a pourable non-thixotropic curable composition. This pack may be supplied to the end user, the filler remaining substantially uniformly distributed in the thixotropic composition during storage. When formation of a pourable curable composition is required by the end user, the two parts can be mixed as hereinbefore described.

Where desired, a three-part pack may be supplied to the end user, the first and second parts being as hereinbefore described for the two-part pack and the third part containing an accelerator for the cure of the epoxide resin with the chosen curing agent.

The compositions of the invention, particularly those containing a polyamine curing agent, are useful in casting or moulding applications, for example in the casting of tools for use in the vacuum forming of thermoplastic materials. A cured casting may be produced by pouring a pourable curable composition as hereinbefore described which is substantially free from entrained gases into a mould and leaving the composition to cure in the mould until it is set to form a casting, whereafter the casting is removed from the mould. Preferably the curing agent (B) is a polyamine as hereinbefore described and the curing in the mould may be accelerated by moderate heating but is usually allowed to proceed at ambient temperature, typically for a period of at least 10 hours. The mould used for production of the casting may be of a material conventionally used for the production of epoxide resin castings, for example wood, plastics or metal. Moulds made from a porous material are usually sealed before use with, for example, a polyurethane varnish. The curable composition may be obtained substantially free from entrained gases by carrying out the mixing of (A) and (B) under vacuum. More usually, the composition is de-gassed after mixing, for example by allowing the mixture to stand to enable air bubbles to rise and break or, preferably, by insertion into a vacuum chamber. Wood or polystyrene blocks can be suspended in the mould cavity to reduce cross-sectional thickness of the composition and thereby reduce the risk of an excessive exotherm. After removing the set casting from the mould it can be post-cured to improve physical properties either at ambient temperature or, more rapidly, at temperatures up to 100° C.

The pourable curable compositions of the invention are also useful in the protection and insulation of electrical or electronic components or assemblies such as transformers, ignition coils, magnetic recording heads, bushings, capacitors, resistors, integrated circuits and hybrid circuits. Accordingly the invention also provides a method of insulating an electrical or electronic component or assembly which comprises pouring a pourable curable composition as hereinbefore described which is substantially free from entrained gases over the component or assembly and thereafter curing the composition to form a solid adherent layer of insulation on the component or assembly. The curable composition may be obtained substantially free of entrained gases by mixing the thixotropic composition (A) and the curing agent (B) under vacuum or by de-gassing after mixing as hereinbefore described. When it is important to ensure good penetration of the curable composition into the structure of a component or assembly, the process is preferably carried out by pouring the composition under vacuum, thereafter releasing the vacuum and, optionally, applying a positive pressure (overpressure) prior to, and/or during, the curing of the composition.

The formation of the insulating layer may be carried out using a technique conventional for the type of component or assembly concerned. For example, some components, such as transformers, may be insulated by a potting technique in which the component is placed in a potting "shell" (a box usually moulded from a plastics material), the pourable composition of the invention is poured over the component to fill the space between the component and the shell until the component is covered by the composition, and the composition is then cured to form an insulating resin structure which is bonded to both the component and the shell, so that the shell becomes an integral part of the potted component. Other components, such as capacitors, may be insulated by encapsulation in a mould, the surface of the mould being treated with a mould released agent to prevent adherence of the composition of the invention and thereby permit removal of the component from the mould after cure of the composition. Whatever the precise processing technique employed, the composition may be cured at ambient temperature as conventional for the chosen curing agent and post-cured at ambient or elevated temperature, usually up to 120° C., in accordance with conventional practice.

In the insulation of wound components such as coils and transformers, excellent impregnation, i.e. penetration, of compositions of the invention into the complex structure of the components can be achieved, for example by introducing the curable composition under vacuum into a mould cavity or potting shell cavity containing the component, increasing the pressure by releasing the vacuum and, if desired, applying overpressure prior to, and/or during, the curing step.

The invention is illustrated by the following Examples, in which parts and percentages are by weight unless otherwise indicated. Thickening agents used in the Examples are prepared as follows:

Thickening Agent I: Dibenzylidenesorbitol

Sorbitol (60.7 g), benzaldehyde (70.7 g), p-toluenesulphonic acid (1 g) and cyclohexane (1 litre) are heated together at reflux temperature, with stirring, under azeotropic conditions for 4 hours, by which time evolution of water has ceased. The reaction mixture is cooled and, after adding aqueous 10% sodium bicarbonate, is filtered. The residue is washed successively with hot water and cold water and dried in a vacuum at 70° C.

Thickening Agent II: Di(4-methoxybenzylidene)sorbitol

The procedure used for the preparation of dibenzylidenesorbitol is repeated, but using 4-methoxybenzaldehyde (90.8 g) in place of benzaldehyde, increasing the amount of cyclohexane to 1.3 liters and heating for 6 hours.

Thickening Agent III: Di(4-chlorobenzylidene)sorbitol

The procedure used for the preparation of dibenzylidenesorbitol is repeated, but replacing the benzaldehyde by 4-chlorobenzaldehyde (93.7 g), increasing the amount of cyclohexane to 1.3 liters and heating for 7 hours.

Thickening Agent IV: Di(4-methylbenzylidene)sorbitol

The procedure used for the preparation of dibenzylidenesorbitol is repeated, but using 4-tolualdehyde (80.1 g) in place of the benzaldehyde and heating for 12 hours.

Thickening Agent V: Dibenzylidenemannitol

The procedure used for the preparation of dibenzylidenesorbitol is repeated, but replacing the sorbitol by mannitol (60.7 g) and heating for 8 hours.

Thickening Agent VI: Dibenzylidenexylitol

The procedure used for the preparation of dibenzylidenesorbitol is repeated, but using xylitol (50.7 g) in place of the sorbitol and heating for 8.5 hours.

Thickening Agent VII: Gel All-D

This is a commercial dibenzylidenesorbitol thixotropic agent available from New Japen Chemical Co. Ltd. of Kyoto-shi, Japan.

Epoxide resins used in the Examples are as follows:
Resin I: A liquid polyglycidyl ether of bisphenol A having an epoxide content of 5.2 equivs./kg.
Resin II: A solid polyglycidyl ether of bisphenol A having an epoxide content of 2.4 equivs./kg.
Resin III: N,N-diglycidylaniline (epoxide content 9.3 equivs/kg.).
Resin IV: A liquid diglycidyl ether of 1,4-butanediol having an epoxide content of 9 equivs/kg.

Diluents used in the Examples are as follows:
Diluent I: dibutyl phthalate
Diluent II: 2-ethylhexyl glycidyl ether Fillers used in the Examples are as follows:
Filler I: trihydrated alumina
Filler II: silica flour
Filler III: sand
Filler IV: tabular alumina
Filler V: wollastonite Curing agents used in the Examples are as follows:
Curing Agent I: triethylenetetramine
Curing Agent II: N-hydroxypropyltriethylenetetramine
Curing Agent III: isophoronediamine
Curing Agent IV: a polyoxypropylenetriamine derived from 1,1,1-trimethylolpropane, available as Jeffamine T-403 from Texaco Ltd., Petrochemical Dept., 195 Knightsbridge, London SW7 1RU, England
Curing Agent V: a polyaminoamide made from polymerised vegetable oil acid and a polyalkylenepolyamine available as Versamid 140 from Cray Valley Products Ltd., Orpington, Kent, England.
Curing Agent VI: a mixture of equal parts of 2,2,4-trimethylhexamethylenediamine and 2,3,3-trimethylhexamethylenediamine.
Curing Agent VII: N,N-diethylpropane-1,3-diamine
Curing Agent VIII: N-(2-aminoethyl)piperazine
Curing Agent IX: methyltetrahydrophthalic anhydride Antifoam A used in the Examples is available from BDH Chemicals, Poole, Dorset, England BYK-W-935 wetting agent used in the Examples is available from K & K Greefe or Suffolk House, George Street, Croydon, England.

EXAMPLES 1-13

Thixotropic compositions containing the following ingredients are prepared:

| Compn. No. | Resin No. | Resin Parts | Diluent No. | Diluent Parts | Filler No. | Filler Parts | Thickening Agent No. | Thickening Agent Parts |
|---|---|---|---|---|---|---|---|---|
| I | I | 86 | I | 14 | II | 150 | I | 1 |
| II | I | 100 | — | | II | 75 | III | 1 |
| III | I | 85 | II | 13 | II | 150 | II | 1 |
|  | II | 2 | | | | | | |
| IV | I | 51 | II | 8 | I | 90 | II | 0.6 |
|  | II | 1 | | | | | | |
| V | I | 86 | I | 14 | I | 150 | I | 1 |
| VI | I | 100 | — | | I | 75 | III | 1 |
| VII | I | 34 | II | 5 | I | 60 | IV | 0.4 |
|  | II | 1 | | | | | | |
| VIII | I | 100 | — | | II | 150 | I | 2 |
| IX | III | 100 | — | | II | 150 | I | 2 |
| X | I | 85 | II | 13 | II | 150 | VI | 2 |
|  | II | 2 | | | | | | |
| XI | II | 67 | — | | I | 150 | II | 1 |
|  | IV | 33 | | | | | | |
| XII | I | 100 | — | | II | 150 | V | 2 |
| XIII | I | 51 | II | 8 | II | 90 | VI | 1.2 |
|  | II | 1 | | | | | | |

With the exception of Thixotropic Compositions II and VI, these compositions are prepared by dissolving the thickening agent in the resin or, where a diluent is present, in the mixture of resin and diluent, at 110° C.-120° C., cooling 50°-60° C. and adding the filler with stirring.

Thixotropic Compositions II and VI are prepared by dissolving the specified amount of thickening agent in three times its weight of N-methylpyrrolidone and adding the solution to a stirred dispersion of the filler in the resin at 60° C.

In each instance, stable thixotropic pastes having non-slump properties are obtained within one hour following the mixing. The fillers show no tendency to settle in these pastes.

Thixotropic Compositions I to XIII are mixed, at ambient temperature, with curing amounts of curing agents selected from Curing Agents I to IX, whereupon they form pourable non-thixotropic curable compositions. The nature of the thixotropic composition and its viscosity prior to addition of the curing agent, the nature of the curing agent and the viscosity of the curable composition (the "mix viscosity") are shown in the following table. The viscosities are measured at 25° C. with Viscometer Model UKRV8 of Viscometer UK Ltd., of Brook Hours, 418 Hale End Road, Highams Park, London E4 9PB, England using a No. 7 Brookfield spindle at a speed of 5 r.p.m.

| Example No. | Thixotropic Composition No. | Viscosity (Pa s) | Curing Agent No. | Curing Agent Parts | Mix Viscosity (Pa s) |
|---|---|---|---|---|---|
| 1 | I | 330 | V | 33.3 | 96 |
| 2 | II | 270 | II | 22 | 17 |
| 3 | III | 120 | VI | 20.1 | 4.2 |
| 4 | IV | 110 | V | 21.8 | 23 |
| 5 | V | 205 | VI | 17.5 | 6.6 |
| 6 | VI | 390 | VIII | 23 | 4.5 |
| 7 | VII | 320 | VIII | 8.8 | 15 |
| 8 | VIII | — | VI | 17.5 | 20 |
| 9 | IX | 80 | V | 70 | 6.2 |
| 10 | X | 118 | VI | 20.1 | 12 |
| 11 | XI | 590 | II | 19 | 173 |
| 12 | XII | 620 | VI | 22 | 20 |
| 13 | XIII | 118 | IX | 49.8 | 5.5 |

EXAMPLES 14-19

Thixotropic compositions are prepared using a mixture of Resin I (85 parts), Resin II (2 parts), Diluent II (13 parts), one of Fillers I to IV and Gel All-D as thickening agent.

Thixotropic Compositions XIV, XV, XVIII and XIX are prepared by dissolving the Gel All-D in three times its weight of N-methylpyrrolidone and adding the solution to a stirred dispersion of the filler in the mixture of resins and diluent at 50°-60° C., stirring being continued for one minute following addition of the solution.

Thixotropic Compositions XVI, XVII, XX and XXI are prepared by dissolving 1 part of Gel All-D in 1.5 parts of N-methylpyrrolidone at 70° C. and adding the resulting hot solution to a stirred dispersion of the filler in the mixture of resins and diluent at 65° C., stirring being continue for a further minute following addition of the solution.

The nature and amounts of the fillers and the amount of Gel All-D in the thixotropic compositions are shown in the following table.

| Composition No. | Filler No. | Parts | Amount of Gel-All-D (Parts) |
| --- | --- | --- | --- |
| XIV | II | 150 | 1 |
| XV | I | 150 | 0.75 |
| XVI | II | 150 | 1 |
| XVII | I | 150 | 1 |
| XVIII | III | 250 | 1 |
| XIX | IV | 250 | 1 |
| XX | III | 250 | 1 |
| XXI | IV | 250 | 1 |

Thixotropic Compositions XIV to XXI are all pastes which show non-slump properties after standing at ambient temperature for one hour after the mixing of their ingredients. On storage for 6 months at ambient temperature, no settlement of the filler in the pastes occurs.

The thixotropic compositions are mixed at ambient temperature with curing amounts of curing agents selected from Curing Agents I to IX, whereupon pourable non-thixotropic curable compositions are obtained. The nature of the thixotropic composition, its viscosity prior to addition of the curing agent, the nature of the curing agent and the viscosity of the composition obtained on mixing are shown in the following table. In Examples 14 and 15, 1.2 parts of 2,4,6-tris(dimethylamino)methylphenol as accelerator and 0.1 part of dyestuff are added together with the curing agent. In Examples 18 and 19, salicylic acid (1.9 parts) is added as accelerator together with the curing agent. The viscosities are measured as in Examples 1-13.

| Example No. | Thixotropic Composition No. | Viscosity (Pa s) | Curing Agent No. | Parts | Mix Viscosity (Pa s) |
| --- | --- | --- | --- | --- | --- |
| 14 | XIV | 420 | III | 19.8 | 7.1 |
| 15 | XV | 175 | III | 19.8 | 5.9 |
| 16 | XVI | 514 | II | 21.1 | 14.1 |
| 17 | XVII | 508 | II | 21.1 | 15.5 |
| 18 | XIV | 420 | IV | 26.4 | 12.4 |
|  |  |  | I | 4.7 |  |
| 19 | XV | 175 | IV | 26.4 | 6.0 |
|  |  |  | I | 4.7 |  |

EXAMPLE 20

Thickening Agent VII (1 part) is dissolved in N-methylpyrrolidone (3 parts). The solution is added to a stirred dispersion of trihydrated alumina (36 parts) and wollastonite (24 parts) in Resin I (39 parts) at 60° C. and stirring is continued for a further minute following addition of the solution. A thixotropic paste having non-slump properties is formed within one hour at ambient temperature. The fillers in the paste show no settlement on storage.

A pourable non-thixotropic curable composition is prepared by mixing the thixotropic paste with a hardener component containing Curing Agent IV (7.7 parts), Curing Agent I (2.2 parts) and Curing Agent VII (1.1 parts). The composition is de-gassed by applying a vacuum thereto and is then poured into an open steel mould having the configuration of a tool for the vacuum forming of thermoplastics materials which has been pretreated with a mould release agent. The composition is left in the mould for 16 hours at ambient temperature, by which time it has set to form a casting. The casting is then removed from the mould and post-cured by heating for 2 hours at 80° C. The resulting casting may be used as a tool for the vacuum-forming of thermoplastics materials.

EXAMPLE 21

Thickening Agent VII (2 parts) is dissolved in N-methylpyrrolidone (6 parts). The solution is added to a stirred mixture of Resin I (95 parts), Resin II (2 parts), Diluent II (13 parts), trihydrated alumina filler (120 parts), Antifoam A (an antifoaming agent containing a silicone in xylene) (0.01 part), resin-coated red phosphorus (10 parts) as flame retardant and BYK-W-935 wetting agent (1.5 parts) at 60° C., and stirring is continued for a further minute following addition of the solution. On leaving the composition to stand at ambient temperature, a thixotropic paste having non-slump properties is formed within one hour. The filler in the paste shows no settlement on storage.

A pourable non-thixotropic curable composition is formed by mixing the thixotropic paste with Curing Agent IV (26.4 parts), Curing Agent I (4.7 parts) and salicylic acid (1.9 parts) as accelerator. This pourable composition has a viscosity of 3.5 Pa s at 25° C. (measured with a Brookfield RVT Viscometer using No. 5 spindle at 5 r.p.m.). The composition is de-gassed by applying a vacuum and then poured over a transformer in a moulded plastic potting shell, filling the space between the transformer and the shell, until the transformer is completely covered by the composition. After leaving for 16 hours at ambient temperature, the composition is set so the potted, insulated transformer is handleable. The composition is post-cured by heating at 80° C. for 2 hours. Cutting away the shell to inspect the transformer reveals excellent penetration of the cured composition into the windings of the transformer, providing an excellent depth of insulation.

We claim:

1. A pourable non-thixotropic curable composition which comprises the product obtained by mixing (A) a filled thixotropic resin composition comprising a curable epoxide resin, a filler and, as thickening agent, a condensation product of a sugar alcohol with an aromatic aldehyde, the composition being thickened and made thixotropic such that the filler remains substantially uniformly dispersed therein on storage, with (B) a curing amount of a curing agent comprising a polyamine having at least one primary amine group attached directly to an aliphatic or cycloaliphatic carbon atom or a polycarboxylic acid anhydride, whereby the thixotropic effect of the thickening agent is substantially counteracted so as to give a pourable curable composition which is no longer thixotropic and has a viscosity up to about 200 Pa s.

2. A composition according to claim 1, in which the epoxide resin is a liquid epoxide resin or a mixture of a solid epoxide resin with sufficient liquid epoxide resin and/or diluent to render the mixture liquid.

3. A composition according to claim 2, in which the epoxide resin is a polyglycidyl ether of a polyhydric phenol, a polyglycidyl ether of a polyhydric alcohol, a poly(N-glycidyl)-derivative of an aromatic amine or a mixture of two or more thereof.

4. A composition according to claim 1, which also contains a monoepoxide diluent or a non-epoxide diluent.

5. A composition according to claim 4, in which the diluent is a monoglycidyl ether of an alcohol or a diester of phthalic acid.

6. A composition according to claim 1, in which the weight ratio of filler to epoxide resin or, where a diluent is present, filler to epoxide resin plus diluent, is from 0.05:1 to 5:1.

7. A composition according to claim 1, in which the sugar alcohol is a pentahydric or hexahydric alcohol.

8. A composition according to claim 7, in which the sugar alcohol is xylitol, mannitol or sorbitol.

9. A composition according to claim 1, in which the aromatic aldehyde is benzaldehyde or an alkyl-, alkoxy- or halo-substituted benzaldehyde.

10. A composition according to claim 1, in which the thickening agent is dibenzylidenesorbitol, di(4-methylbenzylidene)sorbitol, di(4-methoxybenzylidene)sorbitol, di(4-chlorobenzylidene)sorbitol, dibenzylidenemannitol or dibenzylidenexylitol.

11. A composition according to claim 1 in which the thickening agent is incorporated as a solution in an organic solvent which is miscible with the epoxide resin or mixture thereof with a diluent.

12. A composition according to claim 1, in which the thickening agent is present in an amount of 0.5 to 3% by weight of the epoxide resin or, where a diluent is present, by weight of the epoxide resin plus diluent.

13. A method of producing a pourable non-thixotropic curable composition which comprises mixing (A) a filled thixotropic resin composition as specified in claim 1 with (B) a curing amount of a curing agent as specified in claim 1 whereby the thixotropic effect of the thickening agent is substantially counteracted so as to give a pourable curable composition which is no longer thixotropic and has a viscosity up to about 200 Pa s.

14. A method according to claim 13, in which the curing agent (B) is an alkylenediamine or a mono-N-hydroxyalkyl derivative thereof; a polyalkylenepolyamine or a mono-N-hydroxyalkyl derivative thereof; a polyoxyalkylenepolyamine; a N,N-dialkylalkylenediamine; a cycloaliphatic amine having an amino or aminoalkyl substituent attached to the ring; a N-aminoalkylpiperazine; a polyaminoamide; or a mixture of two or more thereof.

15. A method according to claim 13, in which the curing agent (B) is dodecenylsuccinic anhydride or methyltetrahydrophthalic anhydride.

16. A two-part pack comprising a first part containing (A) a filled thixotropic resin composition as specified in claim 1 and a second part containing (B) a curing agent as specified in claim 1, the two parts on mixing giving a pourable non-thixotropic curable composition having a viscosity up to about 200 Pa s.

17. A three-part pack comprising a first part and second part as specified in claim 16, and a third part containing an accelerator for the cure of the epoxide resin with the curing agent.

* * * * *